(12) United States Patent
Dunfee et al.

(10) Patent No.: US 11,913,817 B2
(45) Date of Patent: Feb. 27, 2024

(54) FLUID METERING DEVICE WITH REDUCED CROSS CONTAMINATION

(71) Applicant: Siemens Healthcare Diagnostics Inc., Tarrytown, NY (US)

(72) Inventors: William D. Dunfee, Newark, DE (US); Robert Hopely, Jr., Tombstone, AZ (US); Colin Ingersoll, Wilmington, DE (US); Yudis Moreta, Bear, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/002,473

(22) PCT Filed: Jun. 24, 2021

(86) PCT No.: PCT/US2021/039013
§ 371 (c)(1),
(2) Date: Dec. 19, 2022

(87) PCT Pub. No.: WO2021/263063
PCT Pub. Date: Dec. 30, 2021

(65) Prior Publication Data
US 2023/0194323 A1 Jun. 22, 2023

Related U.S. Application Data

(60) Provisional application No. 62/705,433, filed on Jun. 26, 2020.

(51) Int. Cl.
*G01F 15/00* (2006.01)
*G01F 11/12* (2006.01)
(Continued)

(52) U.S. Cl.
CPC ............ *G01F 15/005* (2013.01); *G01F 11/12* (2013.01); *G01F 15/12* (2013.01); *G01F 15/18* (2013.01)

(58) Field of Classification Search
None
See application file for complete search history.

(56) References Cited

U.S. PATENT DOCUMENTS 4,124,146 A 11/1978 Sealfon
4,795,497 A 1/1989 Mcconnell
(Continued)

FOREIGN PATENT DOCUMENTS

JP H06-213907 A 8/1994
JP H6-249762 A 9/1994
(Continued)

OTHER PUBLICATIONS

PCT International Search Report and Written Opinion dated Sep. 29, 2021 (8 Pages).
(Continued)

*Primary Examiner* — Tran M. Tran

(57) ABSTRACT

Embodiments provide a fluid metering device, including: a first fluid supply port for receiving a first fluid; a first fluid dispense port for dispensing the first fluid; a second fluid supply port for receiving a second fluid; a second fluid dispense port for dispensing the second fluid; a waste discharge port for discharging a mixture of the first fluid and the second fluid; a valve assembly including a plurality of valves; a manifold connected to the metering pump, wherein the manifold includes a plurality of fluid channels, and the manifold is used for communicating between the valve assembly and each port; a first tube connected between the second valve and the third valve for accommodating the mixture or the first fluid; and a second tube connected between the third valve and the fourth valve for accommodating the second fluid.

17 Claims, 9 Drawing Sheets

(51) Int. Cl.
    *G01F 15/12*     (2006.01)
    *G01F 15/18*     (2006.01)

(56)     References Cited

U.S. PATENT DOCUMENTS

| | | |
|---|---|---|
| 6,382,035 B1 | 5/2002 | Nichols |
| 2002/0166586 A1 | 11/2002 | Flavelle |
| 2004/0232162 A1* | 11/2004 | Zimmermann ......... B01L 3/021 222/63 |
| 2010/0212910 A1 | 8/2010 | James |
| 2016/0053650 A1 | 2/2016 | Seitz et al. |
| 2019/0100444 A1 | 4/2019 | Black et al. |

FOREIGN PATENT DOCUMENTS

| | | |
|---|---|---|
| JP | H10-104240 A | 4/1998 |
| WO | 2018/127113 A1 | 7/2018 |
| WO | 2019/043907 A1 | 3/2019 |

OTHER PUBLICATIONS

Extended EP Search Report dated Nov. 30, 2023 of corresponding European Application No. 21829802.4, 4 Pages.

\* cited by examiner

FLUID METERING DEVICE WITH REDUCED CROSS CONTAMINATION

CROSS REFERENCE TO RELATED APPLICATION

This application claims the benefit of U.S. Provisional Patent Application No. 62/705,433, entitled "FLUID METERING DEVICE WITH REDUCED CROSS CONTAMINATION" filed Jun. 26, 2020, the disclosure of which is incorporated by reference in its entirety for all purposes.

TECHNOLOGY FIELD

The present disclosure relates to a fluid metering device. More particularly, the present disclosure relates to a fluid metering device for measuring at least two fluids with reduced cross-contamination.

BACKGROUND

In an immunoassay test, a fluid metering device is required to separate and measure at least two fluids (e.g., a wash solution and water). A conventional immunoassay analyzer (e.g., Atellica® IM analyzer) can fulfill the fluid separation and measurement functions using a plurality of displacement pumps, an independent pump manifold for each displacement pump, and an additional 3-layer 28-valve manifold to dispense the fluids (e.g., a wash solution and water). However, this 3-layer manifold is traditionally very expensive.

Another conventional fluid metering device uses an independent precision metering pump for each fluid. However, because the precision metering pump is an expensive component, the overall cost of the system is high. Thus, it is desired to provide a new fluid metering device that can significantly reduce the cost.

SUMMARY

Embodiments of the present invention address and overcome one or more of the above shortcomings and drawbacks, by providing a fluid metering device for measuring at least two fluids with reduced cross-contamination.

Embodiments provide a fluid metering device, comprising: a first fluid supply port for receiving a first fluid; a first fluid dispense port for dispensing the first fluid; a second fluid supply port for receiving a second fluid; a second fluid dispense port for dispensing the second fluid; a waste discharge port for discharging a mixture of the first fluid and the second fluid; a valve assembly including a plurality of valves, wherein the valve assembly is used for directing the first fluid from the first fluid supply port to the first fluid dispense port, directing the second fluid from the second fluid supply port to the second fluid dispense port, and directing the mixture to the waste discharge port, wherein the valve assembly includes a first valve connected to the first fluid supply port and the metering pump, a second valve connected to the first fluid dispense port, a third valve connected to the second valve and the waste discharge port, and a fourth valve connected to the third valve, the second fluid supply port and the second fluid dispense port; a metering pump for measuring a volume of each fluid; a manifold connected to the metering pump, wherein the manifold includes a plurality of fluid channels, and the manifold is used for communicating between the valve assembly and each port; a first tube connected between the second valve and the third valve for accommodating the mixture or the first fluid, wherein the first tube is configured to prevent the second fluid from reaching the second valve; and a second tube connected between the third valve and the fourth valve for accommodating the second fluid.

Embodiments further provide a fluid metering device, wherein the first fluid is supplied at an elevated pressure, wherein the first valve is a two-way valve, and the second valve, the third valve, and the fourth valve are all three-way valves.

Embodiments further provide a fluid metering device, further comprising a booster pump connected to the first fluid supply port.

Embodiments further provide a fluid metering device, further comprising a tube winding case accommodating the first valve and the second valve, wherein the first tube and the second tube wrap around the tube winding case separately.

Embodiments further provide a fluid metering device, further comprising a first circular cover for covering the first tube; and a second circular cover for covering the second tube.

Embodiments further provide a fluid metering device, further comprising a connecting plate on top of the manifold, wherein the connecting plate is connected to the manifold and the tube winding case, and the first tube and the second tube are connected to the manifold through the connecting plate.

Embodiments further provide a fluid metering device, further comprising a tube winding case, wherein the first tube and the second tube wrap around the first valve and the second valve, and the tube winding case encloses the first tube and the second tube.

Embodiments further provide a fluid metering device, further comprising a third tube connected to the second fluid supply port, a fourth tube connected to the waste discharge port, and a fifth tube connected to the first fluid supply port.

Embodiments further provide a fluid metering device, further comprising a connecting plate on top of the manifold, wherein the first tube, the second tube, the third tube, the fourth tube, and the fifth tube are connected to the manifold through the connecting plate.

Embodiments further provide a fluid metering device, wherein the connecting plate includes a plurality of slots communicating with the plurality of fluid channels in the manifold, and the first tube, the second tube, the third tube, the fourth tube, and the fifth tube are connected to the plurality of slots.

Embodiments further provide a fluid metering device, the plurality of slots includes a first slot connected to the third tube, a second slot connected to one end of the second tube, a third slot connected to the fifth tube, a fourth slot connected to one end of the first tube; a fifth slot connected to the other end of the second tube, a sixth slot connected to the fourth tube, and a seventh slot connected to the other end of the first tube.

Embodiments further provide a fluid metering device, wherein a capacity of the second tube is greater than or equal to a required amount of the second fluid.

Embodiments further provide a fluid metering device, wherein the first valve, the second valve, the third valve, and the fourth valve are all three-way valves, and the first fluid and the second fluid are supplied at an atmospheric pressure.

Embodiments further provide a fluid metering device, further comprising a booster pump connected to the second fluid supply port, so that the second fluid is supplied at an elevated pressure, wherein the valve assembly further comprises a fifth valve connected to the fourth valve, the third valve, and the waste discharge port, wherein the fifth valve is a three-way valve.

Embodiments further provide a fluid metering device, further comprising a booster pump connected to the second fluid supply port, so that the second fluid is supplied at an elevated pressure, wherein the valve assembly further comprises a sixth valve connected to the waste discharge port and the second tube, wherein the sixth valve is a two-way valve.

Embodiments further provide a fluid metering device, wherein the metering pump is a positive displacement pump.

Embodiments further provide a fluid metering device, wherein the first fluid is water, and the second fluid is a wash solution selected from a group comprising Potassium Chloride, Potassium Phosphate, Disodium Phosphate, Sodium Chloride, Sodium Azide, Disodium Ethylenediaminetetraacetic Acid, and Polysorbate 20.

Embodiments provide a fluid metering device, comprising a first fluid supply port for receiving a first fluid, a first fluid dispense port for dispensing the first fluid, a second fluid supply port for receiving a second fluid, a second fluid dispense port for dispensing the second fluid, a waste discharge port for discharging a mixture of the first fluid and the second fluid, a metering pump for measuring a volume of each of the first fluid and the second fluid, a valve assembly used for directing the first fluid from the first fluid supply port to the first fluid dispense port, directing the second fluid from the second fluid supply port to the second fluid dispense port, and directing the mixture to the waste discharge port, wherein the valve assembly includes a first valve connected to the first fluid supply port and the metering pump, a second valve connected to the first fluid dispense port, a third valve connected to the second valve and the waste discharge port, and a fourth valve connected to the third valve, the second fluid supply port and the second fluid dispense port, a first tube connected between the second valve and the third valve for accommodating the mixture or the first fluid, wherein the first tube is configured to prevent the second fluid from reaching the second valve, and a second tube connected between the third valve and the fourth valve for accommodating the second fluid, wherein the second tube is configured to accommodate a required amount of the second fluid.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes embodiments directed to a fluid metering device that utilizes a single-precision metering pump, a single manifold, and a valve assembly to precisely measure two different fluids while minimizing cross-contamination between the fluids. Because only a single-precision metering pump and a single manifold are required in the fluid metering device described herein, the cost is significantly reduced compared to conventional multi-pump systems. The fluid metering device can be used for any scenario where fluid separation is required including, without limitation, immunoassay wash separation.

In an embodiment, a single machined manifold having fluidic channels is connected to a precision metering pump and a valve assembly including four valves to precisely dispense water and a wash solution, while minimizing cross-contamination between the water and the wash solution. Two tubes are connected externally to the manifold in a "loop" configuration for minimal cross-contamination. Moreover, due to the use of external tubes, an expensive layered manifold (e.g., 3-layer manifold) is not required, which further reduces the overall cost of the system.

Figure 1:
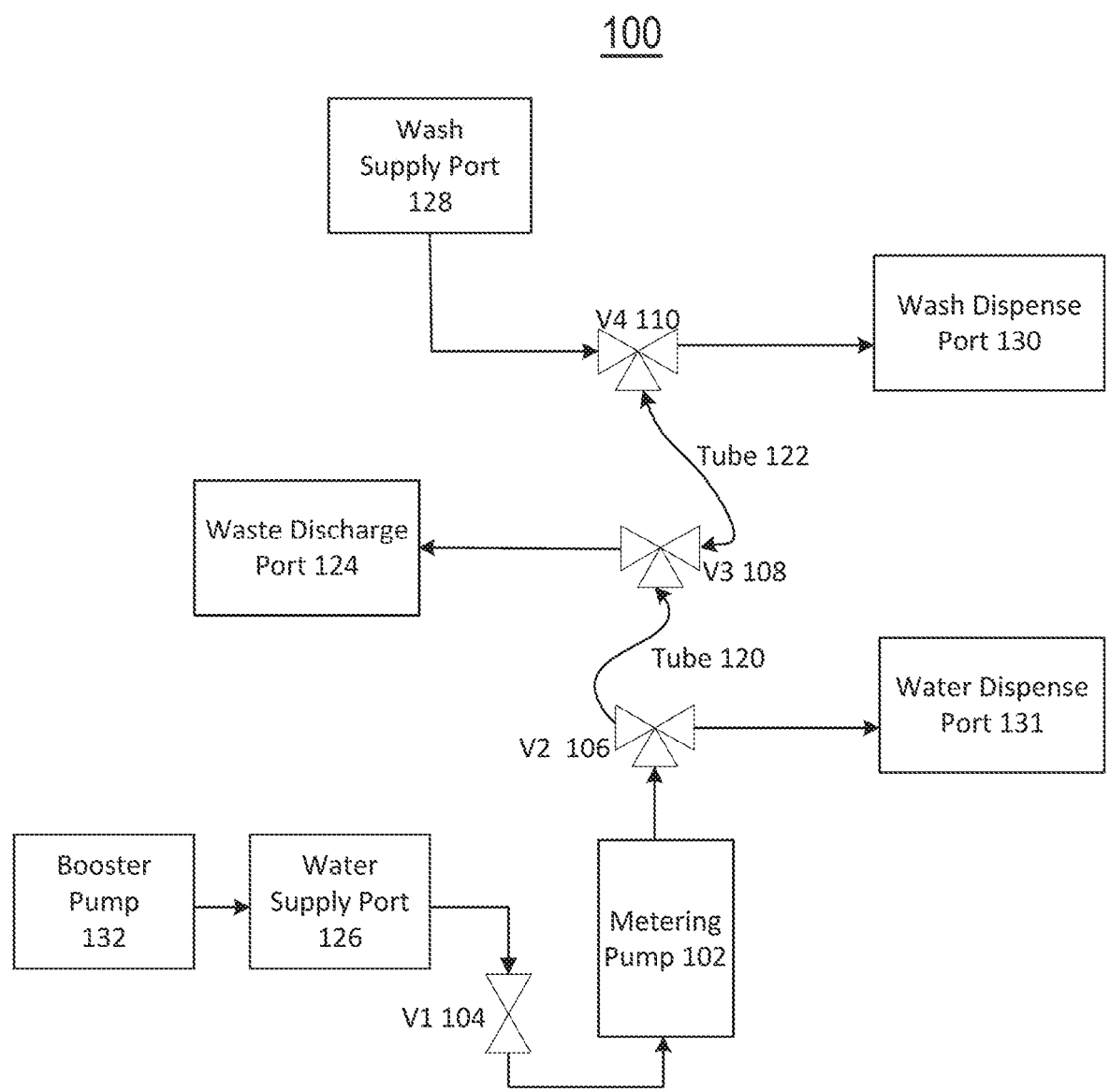
FIG. 1 illustrates a block diagram depicting a working principle of a fluid metering device 100, in accordance with different embodiments described herein.

FIG. 1 illustrates a block diagram depicting a working principle of a fluid metering device 100, in accordance with different embodiments described herein. As shown in FIG. 1, the fluid metering device 100 includes four valves (the first valve 104, the second valve 106, the third valve 108, and the fourth valve 110) and a metering pump 102. In an embodiment, the first valve 104 is a two-way valve, while the second valve 106, the third valve 108, and the fourth valve 110 are three-way valves. In another embodiment, all the four valves can be three-way valves. In one scenario, when the first valve 104 is opened, the second valve 106 is connected to the third valve 108, and the third valve 108 is connected to the waste discharge port 124, the metering pump 102 can aspirate water from the water supply port 126, and dispense the water to the waste discharge port 124, so that waste in the first tube 120 can be discharged. In another scenario, when the first valve 104 is opened, and the second valve 106 is connected to the water dispense port 131, then the metering pump 102 can aspirate water from the water supply port 126, and dispense the water to the water dispense port 131. The water dispense port 131 can then dispense water externally to another device (not shown in FIG. 1).

In a further scenario, when the first valve 104 is closed, the second valve 106 is connected to the third valve 108, the third valve 108 is connected to the fourth valve 110, and the fourth valve 110 is connected to the wash supply port 128, then the metering pump 102 can aspirate a wash solution from the wash supply port 128 into the second tube 122. The length of the second tube 122 may be selected depending on the required amount of wash solution, and the second tube 122 itself can accommodate all the required amount of wash solution. The capacity of the second tube 122 can be greater than or equal to the required amount of wash solution. In an embodiment, the aspirated wash solution is a little (e.g., several milliliters) more than the required amount of wash solution to be dispensed, because some wash solution may be mixed with the water and thus contaminated, and has to be discharged from the waste discharge port 124. In an example, the second tube 122 is full of the wash solution, and the extra wash solution enters into the first tube 120 and is mixed with the water in the first tube 120.

In a further scenario, when the first valve 104 is closed, the second valve 106 is connected to the third valve 108, the third valve 108 is connected to the fourth valve 110, and the fourth valve 110 is connected to the wash dispense port 130, then the wash solution in the second tube 122 can be dispensed externally to another device through the wash dispense port 130. Because the second tube 122 can accommodate enough wash solution for dispensation, thus no liquid from the first tube 120 will be dispensed out.

After the required amount of wash solution is dispensed, the third valve 108 can be switched to connect to the waste discharge port 124. While the first valve 104 is opened and the second valve 106 is connected to the third valve 108, the metering pump 102 can aspirate water from the water supply port 126, and dispense the water to the waste discharge port 124. Thus, the waste (a mixture of wash solution and water) in the first tube 120 can be discharged from the waste discharge port 124.

In an embodiment, the fluid metering device 100 further includes a booster pump 132 connected to the water supply port 126. The booster pump 132 can increase the pressure of the water to, e.g., 11 psi (pound-force per square inch). The pressurized water allows for more water volume to be flushed through the fluid metering device 100 compared to the water at atmospheric pressure. In another embodiment, the water pressure can be increased by another approach, e.g., a water tank with compressed air, or an increase in water elevation.

Figure 2:
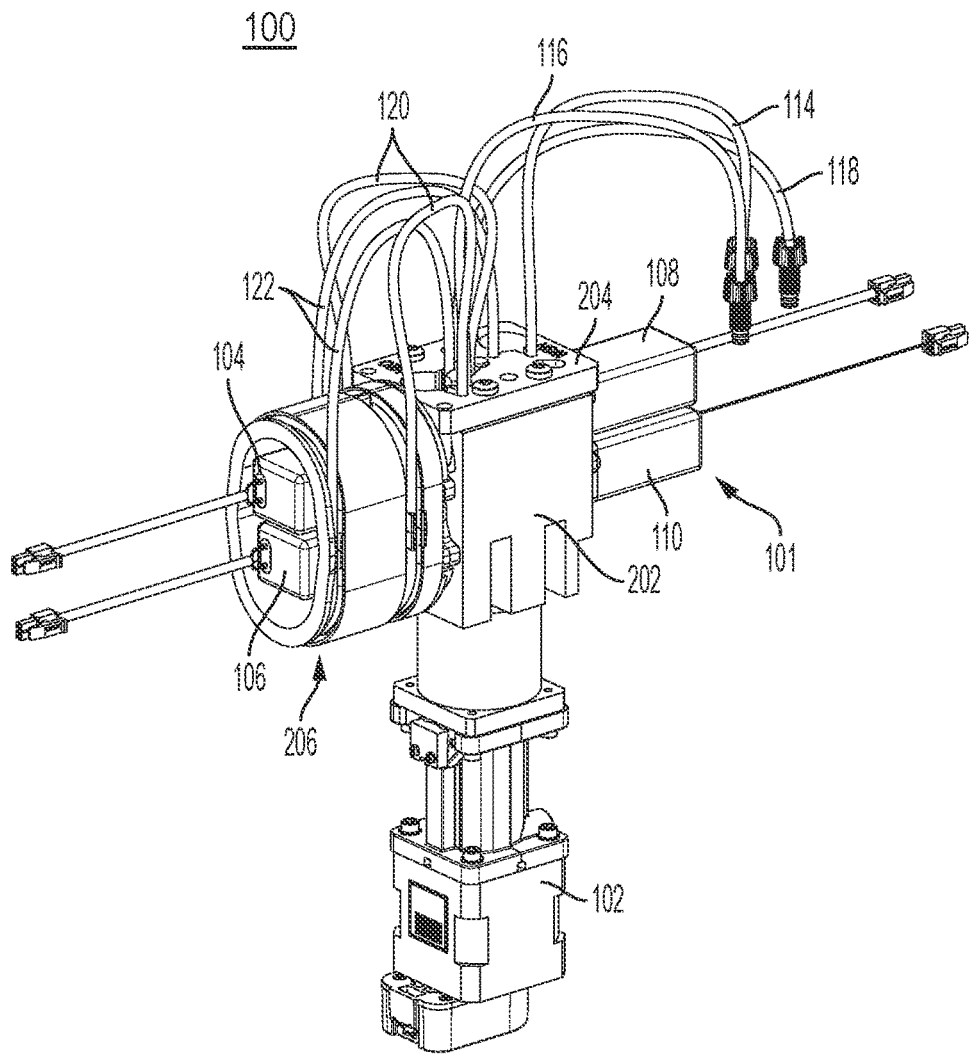
FIG. 2 illustrates a structure of the fluid metering device, in accordance with different embodiments described herein.

FIG. 2 illustrates a structure of the fluid metering device 100, in accordance with different embodiments described herein. The fluid metering device 100 is a compact assembly, instead of multiple disconnected assemblies. As shown in FIG. 2, the fluid metering device 100 comprises a metering pump 102, a valve assembly 101 including four valves (i.e., the first valve 104, the second valve 106, the third valve 108, the fourth valve 110 as shown in FIG. 1), and a manifold 202 containing fluid channels. The fluid metering device 100 further includes a plurality of tubes (i.e., the first tube 120 for connecting the second valve 106 and the third valve 108, and the second tube 122 for connecting the third valve 108 and the fourth valve 110, the third tube 114 for wash solution supply, the fourth tube 116 for waste discharge, the fifth tube 118 for water supply), a connecting plate 204 for easy connection, and a tube winding case 206 around which the first tube 120 and the second tube 122 wrap.

Continuing with reference to FIG. 2, two fluid tubes (i.e., the first tube 120 and the second tube 122) are used as buffers between different fluids (e.g., a wash solution and water). The two fluid tubes may be made of low-cost tubes, instead of expensive fluid channels within a layered manifold as in conventional systems. The valve assembly 101 enables a waste (i.e., a mixture of a wash solution and water) to be discharged through a waste discharge port 124 (shown in FIG. 1), or the two fluid tubes to be linked together. The valve assembly 101 can direct each of the two fluids either through one of the fluid tubes or to one of the dispense ports. In an embodiment, the metering pump 102 is a precision metering pump, which is a positive displacement pump.

In an embodiment, the manifold 202 is used to provide most of the connections shown in FIG. 1. For example, referring to FIGS. 1 and 2, the manifold 202 can be used to connect between the water supply port 126 and the first valve 104, between the first valve 104 and the metering pump 102, between the metering pump 102 and the second valve 106, between the second valve 106 and the first tube 120, between the first tube 120 and the third valve 108, between the third valve 108 and the waste discharge port 124, between the third valve 108 and the second tube 122, between the second tube 122 and the fourth valve 110, between the fourth valve 110 and the wash dispense port 130, and between the fourth valve 110 and the wash supply port 128. In this embodiment, the manifold 202 only has straight channels for the fluids (e.g., water, wash solution, or waste), and allows for straightforward machining operations to fabricate, instead of complex layered construction, which can significantly reduce the cost.

Figure 3:
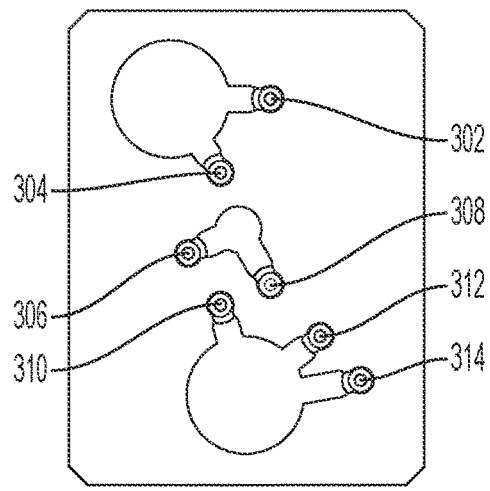
FIG. 3 illustrates a layout of the connecting plate, in accordance with different embodiments described herein.

In an embodiment, the connecting plate (also called a "gang" plate) 204 is provided on top of the manifold 202 and connected to the manifold 202 and the tube winding case 206. FIG. 3 illustrates a layout of the connecting plate 204, in accordance with different embodiments described herein. Referring to FIGS. 1 and 3, the connecting plate 204 includes seven slots which communicate with fluid channels of the manifold 202 respectively. The first slot 302 is used to connect to the third tube 114 for wash solution supply; the second slot 304 is used to connect to one end of the second tube 122 for connecting the third valve 108 and the fourth valve 110; the third slot 306 is used to connect to the fifth tube 118 for water supply; the fourth slot 308 is used to connect to one end of the first tube 120 for connecting the second valve 106 and the third valve 108; the fifth slot 310 is used to connect to the other end of the second tube 122; the sixth slot 312 is used to connect to the fourth tube 116 for waste discharge; the seventh slot 314 is used to connect to the other end of the first tube 120. The slot positions correspond to positions and functions of the fluid channels in the manifold 202. The slot positions may be different if the fluid channels in the manifold 202 are designed differently in positions and/or functions. The plurality of tubes 114, 116, 118, 120, 122 can be connected to the manifold 202 through the connecting plate 204, which can gather the plurality of tubes together for easy connection and space minimization.

Figure 4:
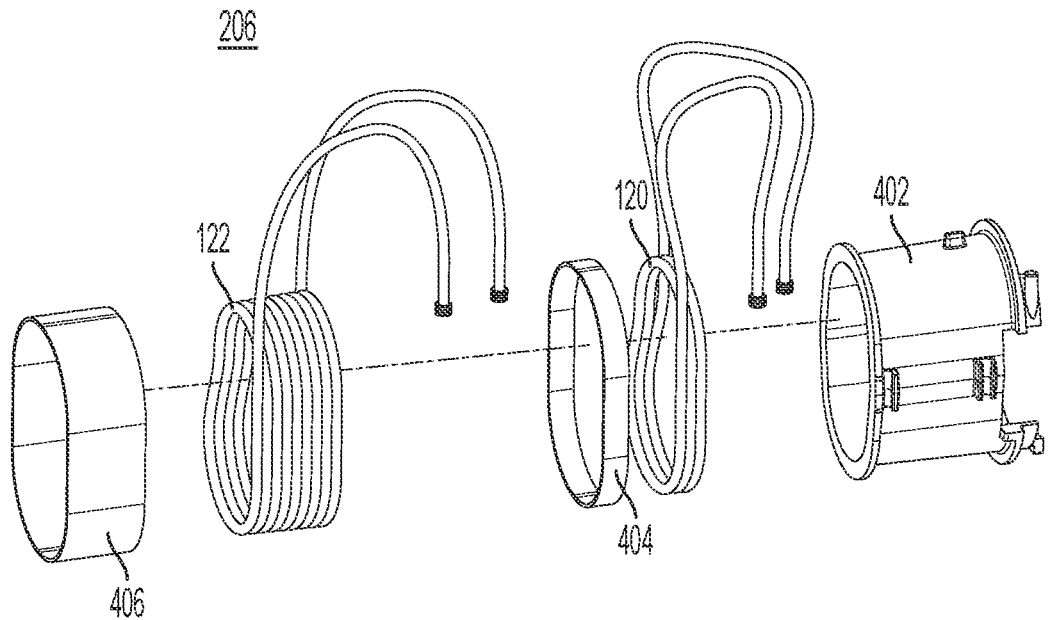
FIG. 4 illustrates an explosive view of the tube winding case, in accordance with different embodiments described herein.

FIG. 4 illustrates an explosive view of the tube winding case 206, in accordance with different embodiments described herein. As shown in FIG. 4, the tube winding case 206 includes a case body 402, the first tube 120, a first circular cover 404 for covering the first tube 120, the second tube 122, and a second circular cover 406 for covering the second tube 122. The case body 402 accommodates two valves, e.g., the first valve 104 and the second valve 106. The second tube 122 for accommodating a wash solution is much longer than the first tube 120 for accommodating water or waste (e.g., four or five times longer); thus, the second tube 122 may have more loops than that of the first tube 120. The first tube 120 and the second tube 122 may wrap around the tube winding case 206 separately. The first circular cover 404 and the second circular cover 406 can accommodate and cover the first tube 120 and the second tube 122, respectively.

Figure 5:
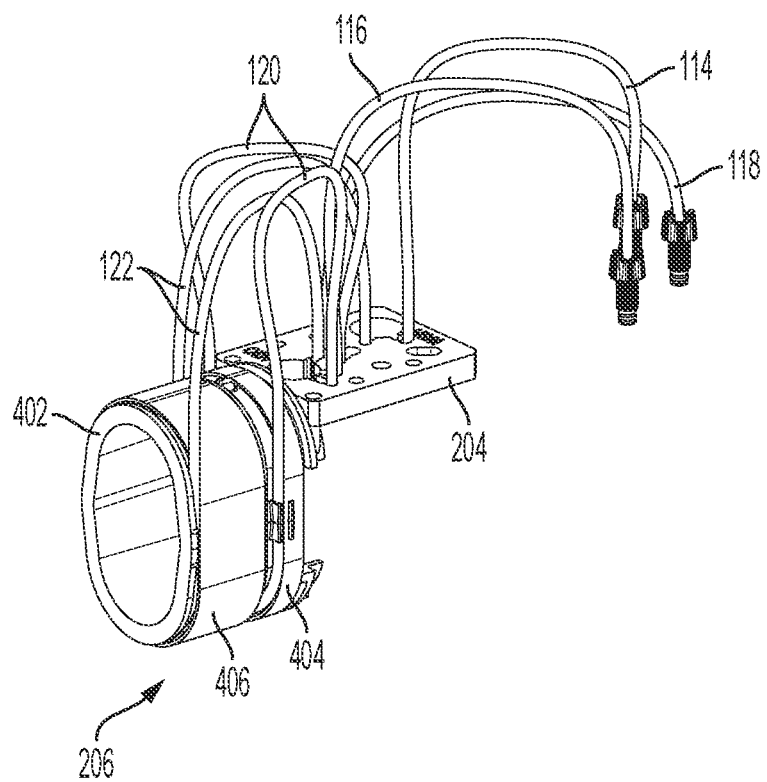
FIG. 5 illustrates a structure of the tube winding case connected to the connecting plate, in accordance with different embodiments described herein.
Figure 6:
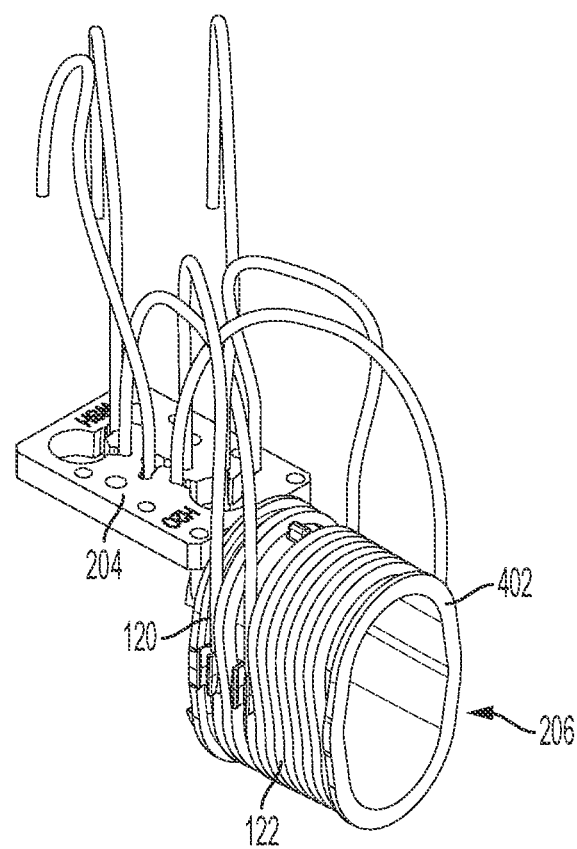
FIG. 6 illustrates a structure of the tube winding case of FIG. 5, without two circular covers.

FIGS. 5 and 6 illustrate a structure of the tube winding case 206 connected to the connecting plate 204, in accordance with different embodiments described herein. FIG. 5 depicts the tube winding case 206 including the first circular cover 404 and the second circular cover 406, while FIG. 6 depicts the tube winding case 206 removing the first circular cover 404 and the second circular cover 406.

Figure 7:
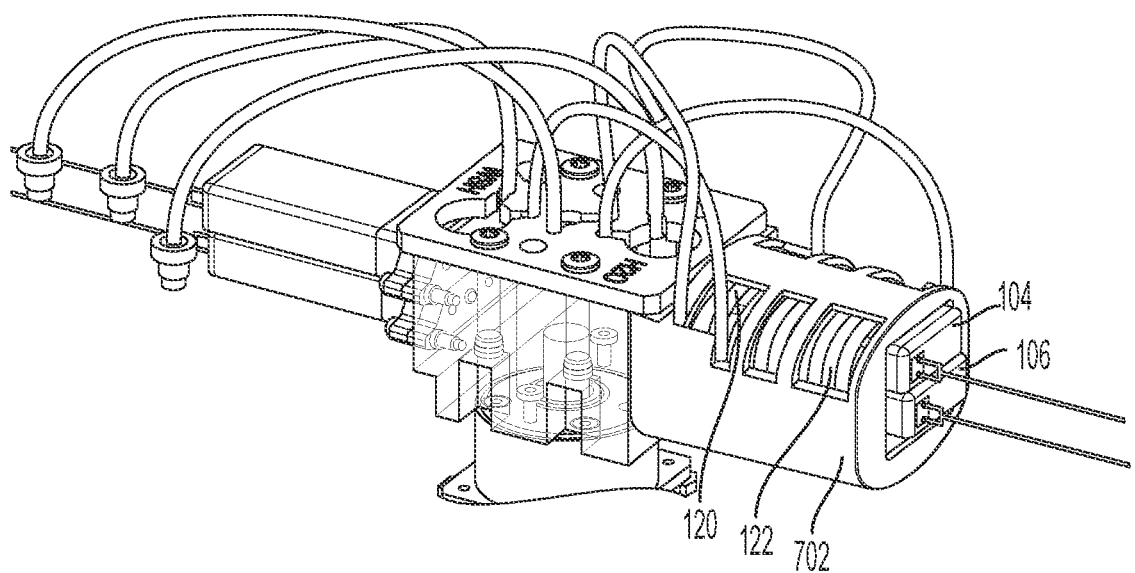
FIG. 7 illustrates another structure of the fluid metering device, in accordance with different embodiments described herein.

FIG. 7 illustrates another structure of the fluid metering device 700, in accordance with different embodiments described herein. The difference between this embodiment and the embodiment as shown in FIG. 2 is how the tube winding case is employed. As shown in FIG. 7, the first tube 120 and the second tube 122 directly wrap around two valves (e.g., the first valve 104 and the second valve 106). The tube winding case 702 encloses the first tube 120 and the second tube 122.

Figure 8:
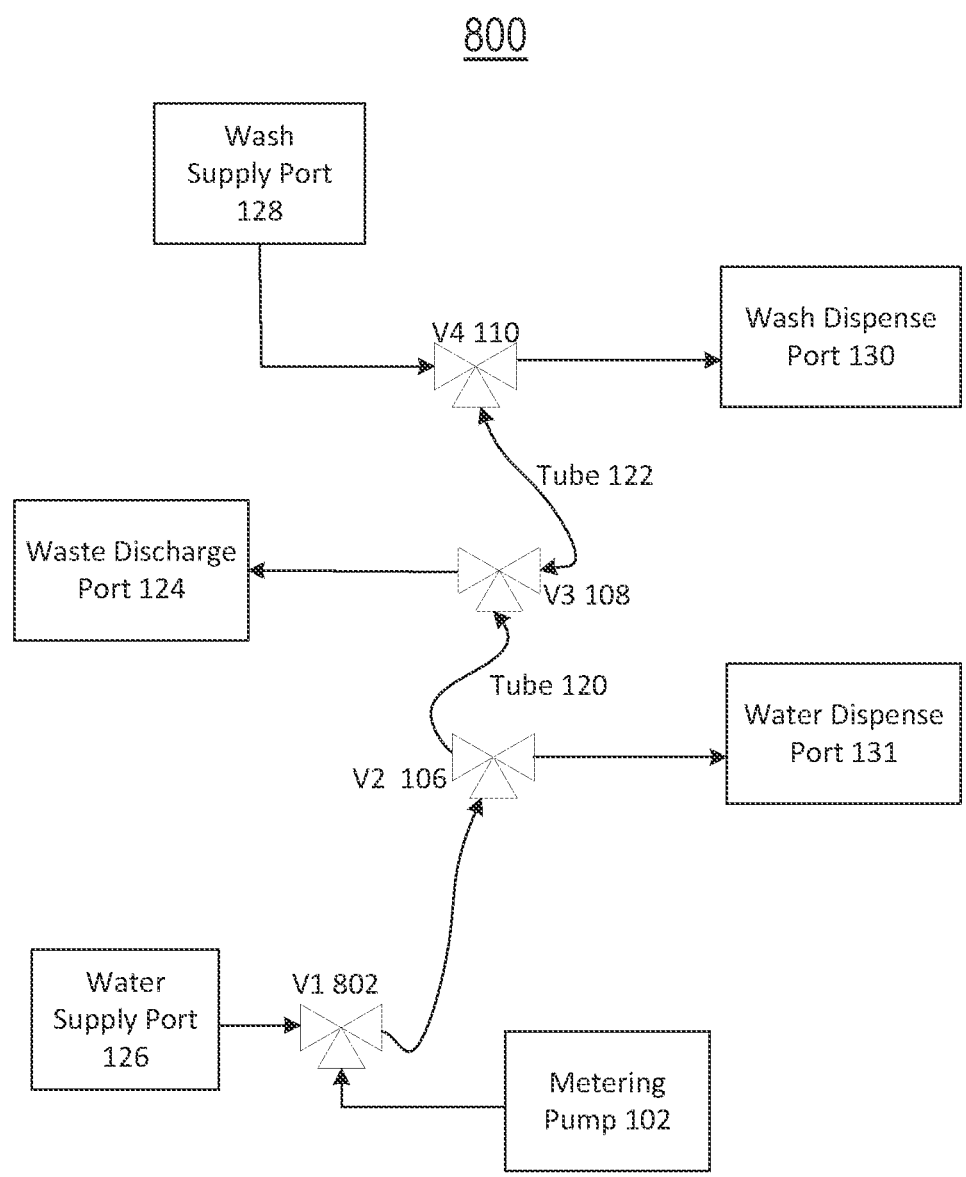
FIG. 8 illustrates another block diagram depicting a working principle of a fluid metering device, in accordance with different embodiments described herein.

FIG. 8 shows another block diagram depicting a working principle of a fluid metering device 800, in accordance with different embodiments described herein. The unique features of this example are best understood in contrast to FIG. 1. In FIG. 1, water is supplied from a pressurized source (i.e., booster pump 132) and enters into the fluid metering device 100 through the first two-way valve 104, while the wash solution (e.g., Potassium Chloride, Potassium Phosphate, Disodium Phosphate, Sodium Chloride, Sodium Azide, Disodium Ethylenediaminetetraacetic Acid, Polysorbate 20, etc.) is supplied at an atmospheric pressure and drawn into the fluid metering device 100 by the metering pump 102. By contrast, in the embodiment as shown in FIG. 8, the first valve 802 is a three-way valve, and the water from the water supply port 126 is provided at atmospheric pressure. No booster pump is provided in this embodiment, and the metering pump 102 can dispense the water to the second valve 106 through the first valve 802.

Figure 9:
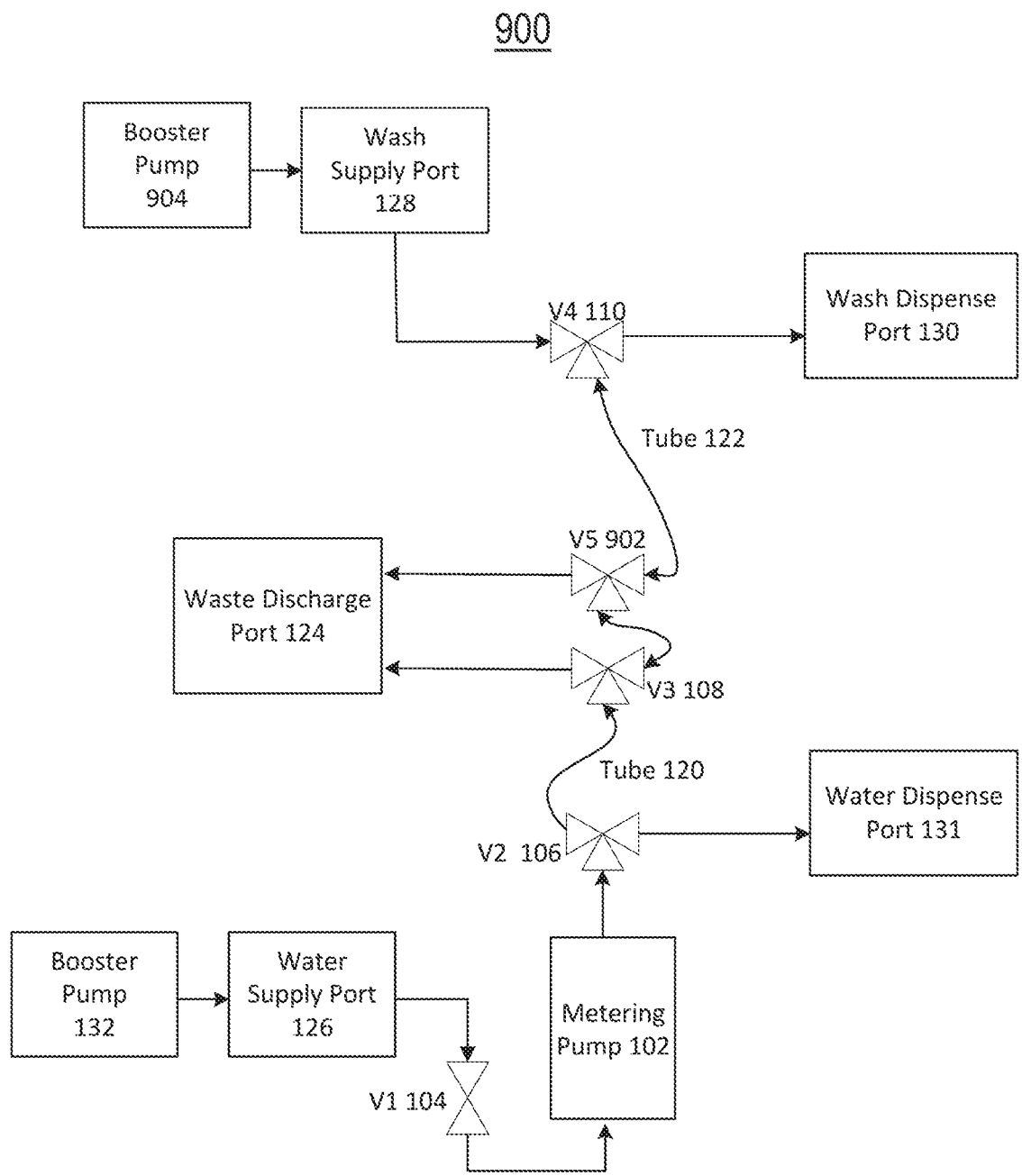
FIG. 9 illustrates another block diagram depicting a working principle of a fluid metering device, in accordance with different embodiments described herein.

FIG. 9 illustrates another block diagram depicting a working principle of a fluid metering device 900, in accordance with different embodiments described herein. In the embodiment as shown in FIG. 9, a second booster pump 904 is provided and connected to the wash supply port 128, and the wash solution from the wash supply port 128 can also be provided at an elevated pressure, e.g., 12 psi. Additionally, a fifth valve 902 (a three-way valve) is provided between the third valve 108 and the second tube 122. In a scenario, the fifth valve 902 and the fourth valve 110 are opened to allow the wash solution at an elevated pressure (a pressure higher than the atmospheric pressure) to flow from the wash supply port 128 to the waste discharge port 124. When the second tube 122 is charged with the required amount of the wash solution, the fourth valve 110 is closed to stop the wash supply, and the fifth valve 902 is still opened to allow the pressure to dissipate to the waste discharge port 124.

Figure 10:
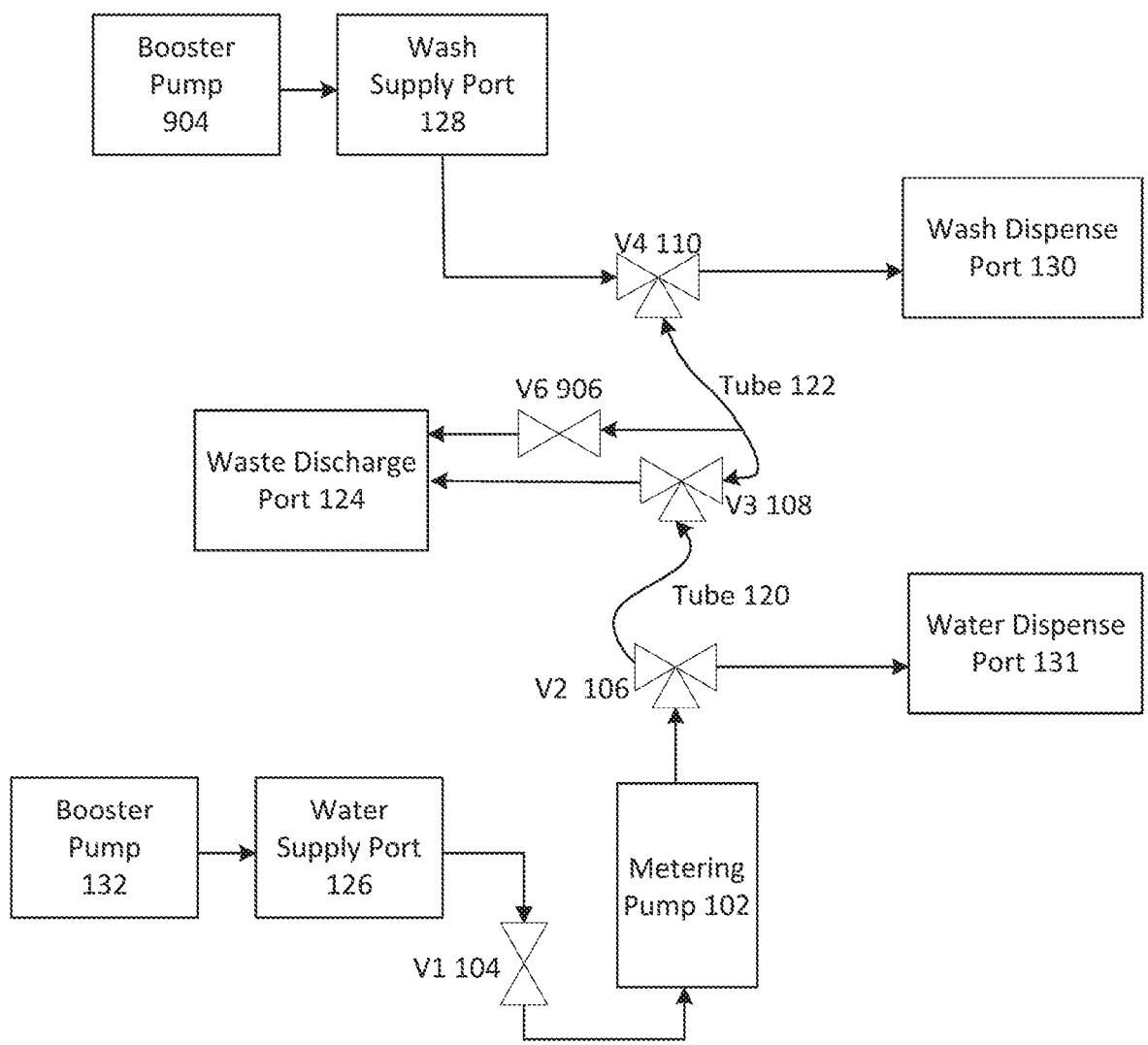
FIG. 10 illustrates another block diagram depicting a working principle of a fluid metering device, in accordance with different embodiments described herein.

FIG. 10 shows another block diagram depicting a working principle of a fluid metering device 950, in accordance with different embodiments described herein. In the embodiment as shown in FIG. 10, a second booster pump 904 is provided and connected to the wash supply port 128, and the wash solution from the wash supply port 128 can also be provided at an elevated pressure, e.g., 13 psi. Additionally, a sixth valve 906 (a two-way valve) is provided between the tube 122 and the waste discharge port 124. In a scenario, the sixth valve 906 is opened to allow the wash solution at an elevated pressure to flow from the wash supply port 128 to the waste discharge port 124. When the second tube 122 is charged with the required amount of the wash solution, the fourth valve 110 is closed to stop the wash supply, and the sixth valve 906 is still opened to allow the pressure to dissipate to the waste discharge port 124, while the third valve 108 and the metering pump 102 are used to dissipate the pressure to the first tube 120.

The fluid metering device 100 is a compact assembly, instead of multiple disconnected assemblies. Thus, all the components are positioned near to each other, and distances between components are reduced. Accordingly, fluid volumes between components are reduced. In turn, the reduction in fluids allows the fluid metering device 100 to be designed as a stiff fluidic system with a high resonant frequency, well above frequencies of the components, because the resonant frequency of a fluid channel is inversely proportional to the length of the fluid channel. Accordingly, oscillations of the fluid metering device 100 can be significantly reduced, thus decreasing settling time after pump motion stops.

Figure 11A:
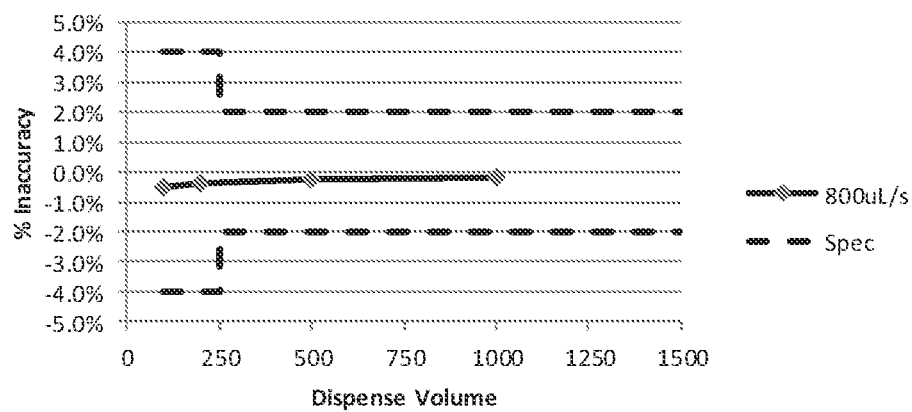
FIG. 11A and FIG. 11B depict metering inaccuracy and imprecision for water, in accordance with an embodiment described herein.
Figure 11B:
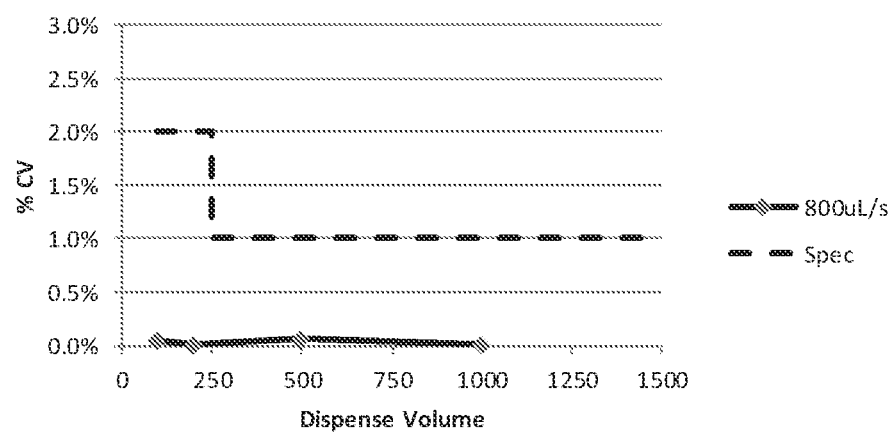
Figure 11C:
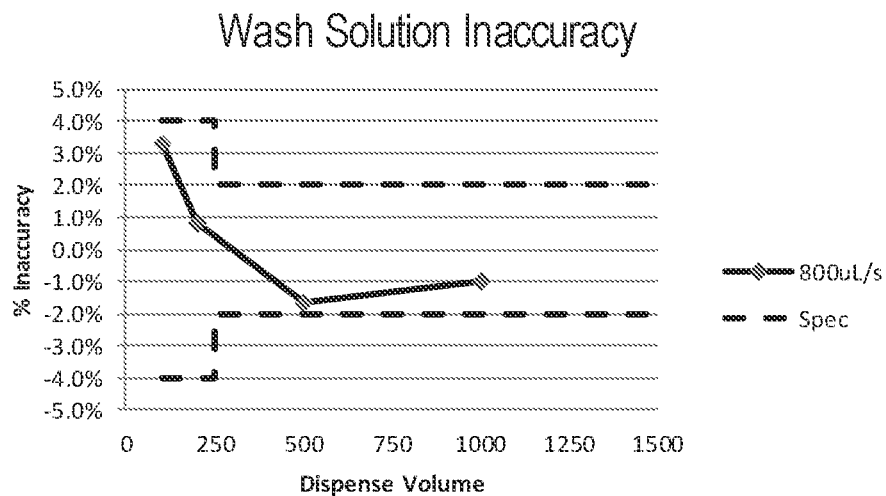
FIG. 11C and FIG. 11D depict metering inaccuracy and imprecision for a wash solution, in accordance with an embodiment described herein.
Figure 11D:
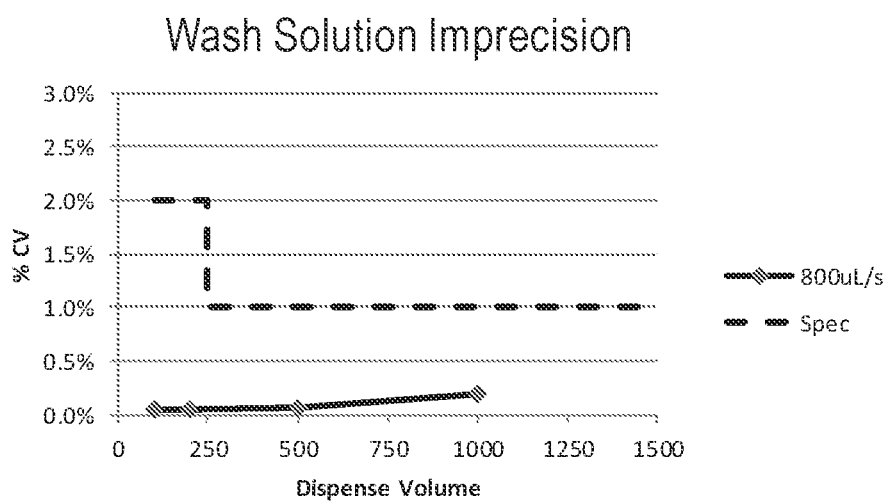

Further, cross-contamination on a system (e.g., an immunoassay analyzer) utilizing the fluid metering device 100 is significantly less, while the metering accuracy and precision are also improved. FIGS. 11A-11D show improved metering accuracy and precision in an immunoassay analyzer system utilizing fluid metering device 100. FIG. 11A and FIG. 11B depict metering inaccuracy and imprecision for water at a dispense speed of 800 uL/s, compared to the specification requirements. FIG. 11C and FIG. 11D depict metering inaccuracy and imprecision for a wash solution at a dispense speed of 800 uL/s, compared to the specification requirements.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes may be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A fluid metering device, comprising:
   a first fluid supply port for receiving a first fluid;
   a first fluid dispense port for dispensing the first fluid;
   a second fluid supply port for receiving a second fluid;
   a second fluid dispense port for dispensing the second fluid;
   a waste discharge port for discharging a mixture of the first fluid and the second fluid;
   a metering pump for measuring a volume of each fluid;
   a valve assembly including a plurality of valves, wherein the valve assembly is used for directing the first fluid from the first fluid supply port to the first fluid dispense port, directing the second fluid from the second fluid supply port to the second fluid dispense port, and directing the mixture to the waste discharge port, wherein the valve assembly includes a first valve connected to the first fluid supply port and the metering pump, a second valve connected to the first fluid dispense port and the metering pump, a third valve connected to the second valve and the waste discharge port, and a fourth valve connected to the third valve, the second fluid supply port and the second fluid dispense port;
   a manifold connected to the metering pump, wherein the manifold includes a plurality of fluid channels, and the manifold is used for communicating between the valve assembly and each port;
   a first tube connected between the second valve and the third valve for accommodating the mixture or the first fluid, wherein the first tube is configured to prevent the second fluid from reaching the second valve; and
   a second tube connected between the third valve and the fourth valve for accommodating the second fluid, wherein the second tube is configured to accommodate a required amount of the second fluid.

2. The fluid metering device as recited in claim 1, wherein the first fluid is supplied at an elevated pressure, wherein the first valve is a two-way valve, and the second valve, the third valve, and the fourth valve are all three-way valves.

3. The fluid metering device as recited in claim 2, further comprising a booster pump connected to the first fluid supply port.

4. The fluid metering device as recited in claim 1, further comprising a tube winding case accommodating the first valve and the second valve, wherein the first tube and the second tube wrap around the tube winding case separately.

5. The fluid metering device as recited in claim 4, further comprising:
   a first circular cover for covering the first tube; and
   a second circular cover for covering the second tube.

6. The fluid metering device as recited in claim 4, further comprising a connecting plate on top of the manifold, wherein the connecting plate is connected to the manifold and the tube winding case, and the first tube and the second tube are connected to the manifold through the connecting plate.

7. The fluid metering device as recited in claim 1, further comprising a tube winding case, wherein the first tube and the second tube wrap around the first valve and the second valve, and the tube winding case encloses the first tube and the second tube.

8. The fluid metering device as recited in claim 1, further comprising a third tube connected to the second fluid supply port, a fourth tube connected to the waste discharge port, and a fifth tube connected to the first fluid supply port.

9. The fluid metering device as recited in claim 8, further comprising a connecting plate on top of the manifold, wherein the first tube, the second tube, the third tube, the fourth tube, and the fifth tube are connected to the manifold through the connecting plate.

10. The fluid metering device as recited in claim 9, wherein the connecting plate includes a plurality of slots communicating with the plurality of fluid channels in the manifold, and the first tube, the second tube, the third tube, the fourth tube, and the fifth tube are connected to the plurality of slots.

11. The fluid metering device as recited in claim 10, the plurality of slots includes a first slot connected to the third tube, a second slot connected to one end of the second tube, a third slot connected to the fifth tube, a fourth slot connected to one end of the first tube; a fifth slot connected to the other end of the second tube, a sixth slot connected to the fourth tube, and a seventh slot connected to the other end of the first tube.

12. The fluid metering device as recited in claim 1, wherein a capacity of the second tube is greater than or equal to a required amount of the second fluid.

13. The fluid metering device as recited in claim 1, wherein the first valve, the second valve, the third valve, and the fourth valve are all three-way valves, and the first fluid and the second fluid are supplied at an atmospheric pressure.

14. The fluid metering device as recited in claim 1, further comprising a booster pump connected to the second fluid supply port, so that the second fluid is supplied at an elevated pressure, wherein the valve assembly further comprises a fifth valve connected to the fourth valve, the third valve, and the waste discharge port, wherein the fifth valve is a three-way valve.

15. The fluid metering device as recited in claim 1, further comprising a booster pump connected to the second fluid supply port, so that the second fluid is supplied at an elevated pressure, wherein the valve assembly further comprises a sixth valve connected to the waste discharge port and the second tube, wherein the sixth valve is a two-way valve.

16. The fluid metering device as recited in claim 1, wherein the metering pump is a positive displacement pump.

17. The fluid metering device as recited in claim 1, wherein the first fluid is water, and the second fluid is a wash solution selected from a group comprising Potassium Chloride, Potassium Phosphate, Disodium Phosphate, Sodium Chloride, Sodium Azide, Disodium Ethylenediaminetetraacetic Acid, and Polysorbate 20.

\* \* \* \* \*